United States Patent [19]

Autrey

[11] Patent Number: 4,880,245

[45] Date of Patent: Nov. 14, 1989

[54] CHUCK FOR CONCRETE SLAB DOWELS

[75] Inventor: Bob Autrey, Azle, Tex.

[73] Assignee: Carbonic Systems of America, Inc., Tolar, Tex.

[21] Appl. No.: 188,281

[22] Filed: Apr. 29, 1988

[51] Int. Cl.[4] .............................................. B23B 31/00

[52] U.S. Cl. ...................................... 279/1 R; 279/7; 279/9 R; 81/120

[58] Field of Search ................. 81/120; 279/1 A, 1 B, 279/1 R, 7, 9 R, 16, 18, 32, 87, 104, 105, 16

[56] References Cited

U.S. PATENT DOCUMENTS

| | | | |
|---|---|---|---|
| 810,304 | 1/1906 | Remion . | |
| 861,030 | 7/1907 | Hansen | 81/120 |
| 906,040 | 12/1908 | Lucas | 81/120 |
| 1,321,776 | 11/1919 | Stepanian | 81/120 |
| 1,336,794 | 4/1920 | Stepanian | 81/120 |
| 1,590,200 | 5/1924 | McGuckin | 81/120 |
| 1,686,412 | 7/1927 | Lacerda | 81/120 |
| 2,632,352 | 12/1950 | Alpers | 81/179 |
| 2,787,181 | 9/1955 | Montgomery | 81/179 |
| 3,161,090 | 12/1964 | McLellan | 81/120 |
| 3,238,823 | 6/1964 | Snow | 81/179 |
| 3,545,777 | 12/1970 | Friedheim | 279/7 |
| 3,881,377 | 5/1975 | Evans et al. | 81/186 |
| 3,979,978 | 9/1976 | Smolik | 81/120 |

*Primary Examiner*—Z. R. Bilinsky

*Assistant Examiner*—Daniel W. Howell

*Attorney, Agent, or Firm*—James E. Bradley

[57] ABSTRACT

A chuck for use in screwing one threaded member into another threaded member has a housing with a polygonal socket on one end for receiving a polygonal drive head of a wrench. The housing has a conical bore converging from the face toward the socket. A plurality of retainers are releasably mounted in the bore in a circular array. Each retainer has edges on opposite sides that are spaced apart from the edges of the adjacent retainers to define a receptacle between each of the retainers. A plurality of blades are releasably inserted into the receptacles. Each blade has a gripping edge that protrudes inward from the receptacle, defining with the gripping edges of the other blades a conical space that converges toward the socket for gripping one of the threaded members.

14 Claims, 2 Drawing Sheets

CHUCK FOR CONCRETE SLAB DOWELS

BACKGROUND OF THE INVENTION

1. Field of the Invention

This invention relates in general to a chuck for engaging a rod to rotate it, and in particular to a chuck for connection to a power driven wrench to screw a dowel into a threaded sleeve in a concrete slab.

2. Description of the Prior Art

In one type of concrete construction, particularly in roadways, the concrete slabs are tied together with reinforcing rods. Reinforcing rods extend through the slab and terminate in a threaded sleeve at the end. The threaded sleeve is exposed.

After hardening, workers then insert a dowel into each sleeve. The dowel is firmly secured by using a pipe wrench. This typically takes four to five minutes for each dowel. It particularly is a problem if cement or other material has gotten into the threads of the sleeve. These dowels, which are about eighteen inches long, are tied to reinforcing rods for the next slab.

SUMMARY OF THE INVENTION

In this invention, a chuck is used to screw the dowels into the threaded sleeves, rather than a pipe wrench. The chuck has a housing with a socket on one end. The socket is adapted to receive the drive head of a power driven wrench.

The housing has a bore which contains a plurality of retainers. Gripping blades are mounted to the retainers. The blades are hard metal inserts that releasably locate in receptacles of the retainers. The retainers and the blades defining a conical space for receiving the end of the dowel.

DETAILED DESCRIPTION F THE INVENTION

Figure 1:
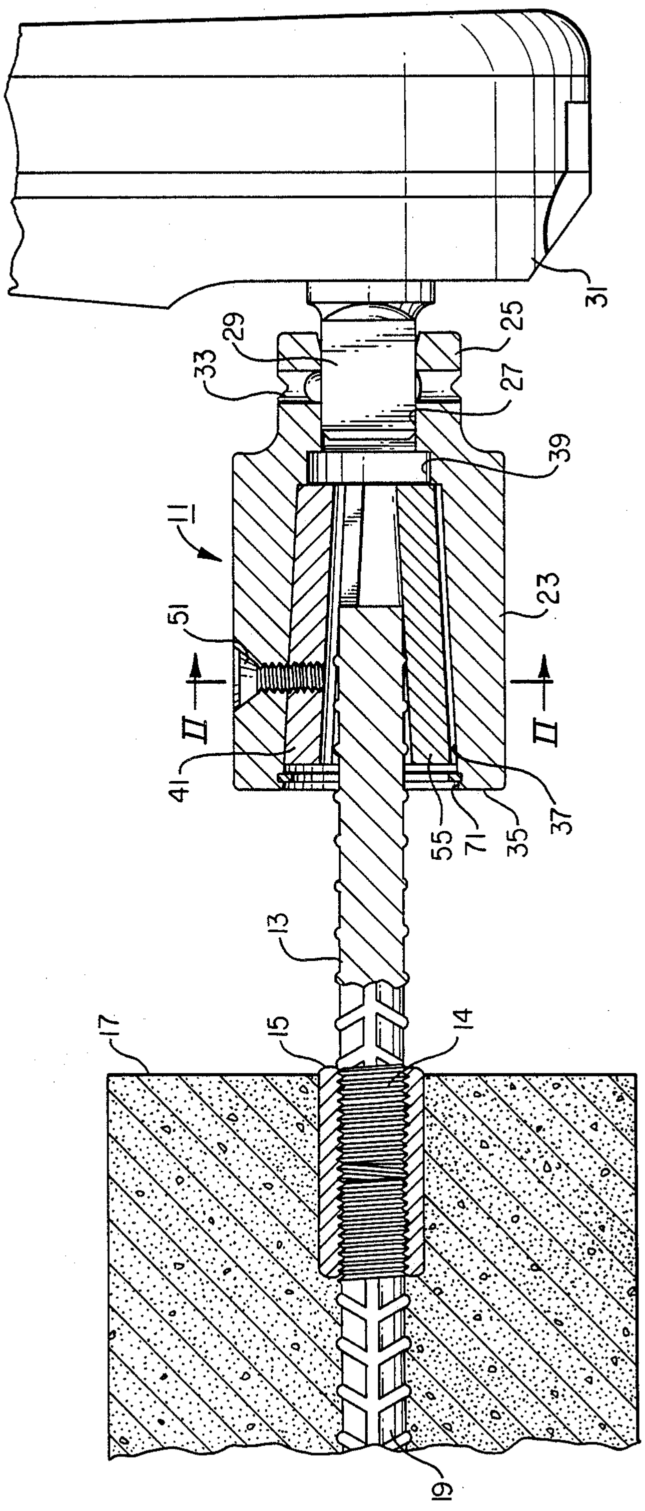
FIG. 1 is a side view illustrating a chuck constructed in accordance with this invention.

With reference now to the figures and in particular with reference to FIG. 1, chuck 11 serves as an adapter to screw a dowel 13 into a threaded sleeve 15. Dowel 13 is a hard metal rod, typically about three-fourths inch in diameter and about eighteen inches long. It has threads 14 on one end for engaging the threads of sleeve 15. The opposite end is not threaded. The sleeve 15 has been previously secured to the end of a reinforcing rod 19. Sleeve 15 is embedded Within the slab 17, which is hardened prior to connecting the dowel 13. The outer end of sleeve 15 is substantially flush with the end of the slab 17.

Chuck 11 has a cylindrical housing 23. Housing 23 has on one end a socket 25. Socket 25 protrudes outward from the housing 23. It has a smaller outer diameter and a polygonal hole 27. Hole 7, preferably square, is adapted to receive a drive head 29 of a power driven wrench 31, preferably an air driven impact wrench. A pair of holes 33 lead from the polygonal hole 27 to the outer wall of the socket 25. A detent (not shown) in the drive head 29 engages a depression (not shown) in the polygonal hole 27 to assist and retain the housing 23 with the wrench 31.

Housing 23 has a circular rim or face 35 on the end opposite the socket 25. Face 35 encircles a conical bore 37 that extends into the housing 23. The bore 37 converges from the face 35 to a smaller diameter near the socket 25. Conical bore 37 joins a cylindrical region 39 located between the polygonal hole 27 and the inner end of the conical bore 37.

Figure 2:
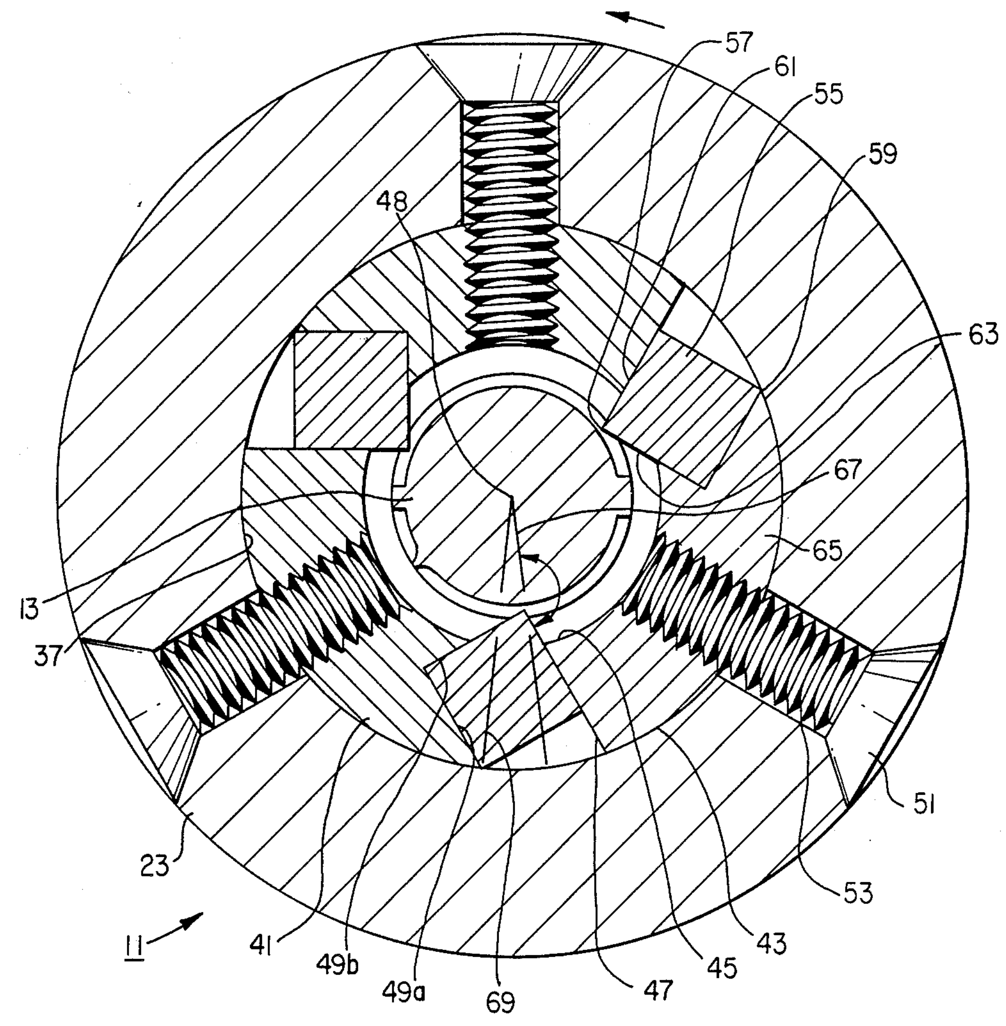
FIG. 2 is a sectional view of the chuck of FIG. 1, taken along the line I—I.

Referring now to FIG. 2, three retainers 41 are mounted inside the conical bore 37. Each retainer 41 is a segment of a cylinder. Each retainer 41 has a cylindrical outer side 43 that mates with a portion of the conical bore 37. Each retainer has an inner side 45 that is also cylindrical. The radial thickness of each retainer 41 is constant from the face 35 (FIG. 1), to the cylindrical region 39. The circumferential dimension of each retainer 41, however, tapers from a greater dimension at the face 35 to a reduced dimension at the cylindrical region 39.

Each retainer 41 has an edge 47 on one side. Edge 47 is a flat surface that inclines relative to a radial line emanating from the longitudinal axis of housing 23 and passing through any point of the edge 47. The opposite edge of each retainer 41 has two flat inclined portions **49*a* and 49*b*. The portions 49*a* and 49*b* preferably are formed at a right angle relative to each other. The edge portion 49*a* is spaced apart from and parallel to the inclined edge portion 47 of the adjacent retainer 41 The combined edge portions 49*a* and 49*b* define a longitudinal recess extending along the length of the retainer 41** This recess has a constant width and depth.

The retainers 41 each extend about 90 from the outermost point of edge portion **49*a* to the outermost point of edge 47. As previously mentioned, the circumferential distance from edge 47 to edge portion 49*a* decreases due to the taper of the conical bore 37. The actual distance from the edge 47 to the edge portion 49*a* of the adjacent retainer 41** remains a constant from one end to the other.

Each retainer 41 is releasably and rigidly mounted in the conical bore 37 by means of a screw 51. The screws 51 are located 120° apart from each other. Each screw 51 extends through a passage 53 in housing 23 into a threaded hole in the retainer 41.

The space between the edge portions **49*a*, 49*b* and the edge 47 of an adjacent retainer 41 defines a receptacle. A gripping blade 55 slides into this receptacle with a close fit. The retainers 41 rigidly hold the blades 55 in a circular array 120° apart from each other. The gripping blade 55 is preferably a hard metal insert, such as typically used as a cutting tool on a metal lathe. The blade 55 may be of tool steel or tungsten carbide and will preferably be much harder than the retainers 41 and housing 23. Each blade 55 preferably is square in transverse cross-section and extends for the full length of each retainer 41. A gripping edge or corner 57 will protrude inward a constant distance from the inner sides 45 of the retainers 41. A supporting corner or edge 59 is located diagonally from the gripping edge 57 and touches the conical bore 37 of housing 23**.

Considering the direction of rotation, the blade 55 has a leading surface 61 which is forward of the gripping edge 57. It has a trailing surface 63 which follows the gripping edge 57. The leading surface 61 and the trailing surface 63 intersect each other at a 90° angle at the gripping edge 57. The retainer sides 47 and **49*a* are oriented such that the leading surface 61 will intersect a radial line 67 emanating from axis 48 and paging through the gripping edge 57 at selected angle 65. Angle 65 is greater than 135° less than 180°. In the preferred embodiment, angle 65 is about 165°. Leading surface 61 thus leads radial line 67. The angle of which the trailing surface 63 intersects the radial line 67 would be about 105°. A radial line 69 passing through the supporting corner 59 lags radial line 67 at an angle of about 15°. As shown in FIG. 1, the blades 55 are held in position by a snap-ring 71 which locates in a groove just inward from the face 35**.

In operation, the user inserts the threaded end 14 of dowel 13 into the sleeve 15. The user inserts the drive head 29 into the socket 25, then places the housing 23 over the dowel 13. The gripping edges 57 Will define a conical space within the bore 37. Consequently, regardless of the differences in diameters of the dowels 13, the blades 55 will at some point engage the dowel 13. The gripping edges 57 will cut slightly into the end of the cylindrical dowel 13 as the user applies inward pressure with the wrench 31.

The user then supplies air pressure to the wrench 31 to rotate the housing 23. The housing 23 Will rotate as indicted by the arrow in FIG. 2. The gripping edges 57 will cause the dowel 13 to rotate and screw into the sleeve 15. After the dowel 13 is fully screwed into the sleeve 15, the user simply pulls outward with the wrench 31. This withdraws the chuck 11 from the dowel 13.

With repeated use, the gripping edges 57 will become dull. Because the blade 55 is a rectangular object of constant width and thickness throughout its length, it can be removed and reinserted so that another corner will become the gripping edge 57.

The invention has significant advantages. Rather than spending four to five minutes, as in the prior art, to screw a dowel into a threaded sleeve, the user will spend only a few seconds for each dowel. This is a great savings in time and thus expense. The gripping blades can be reused by inverting them in the receptacles when worn. No adjustments are required for dowels of differing diameters.

While the invention has been shown in only one of its reforms, it should be apparent to those skilled in the art that it is not so limited but is susceptible to various changes without departing from the scope of the invention.

I claim:

1. A chuck for use in rotating a member, comprising in combination:

a housing having a polygonal socket on one end for receiving a polygonal drive head of a wrench to rotate the housing with the wrench;

the housing having a bore extending from an opposite end toward the socket;

a plurality of retainers releasably mounted in the bore in a circular array, each retainer having edges on opposite sides that are spaced apart from the edges of the adjacent retainers to define a receptacle between each of the retainers;

a plurality of blades, each releasably inserted into one of the receptacles, each blade having an inner edge that defines with the edges of the other blades a conical space that converges toward the socket for gripping the member; and securing means for securing the blades in the receptacles.

2. The chuck according to claim 1 wherein the blades are of a harder material than the retainers.

3. The chuck according to claim 1 wherein each of the blades is rectangular, and wherein each of the receptacles positions one of the blades with one edge protruding inward from the retainers.

4. An apparatus for rotating a member, comprising in combination:

a housing having a polygonal socket on one end;

a power driven wrench having a polygonal drive head for insertion into the socket to rotate the housing with the wrench;

the housing having a bore extending from an opposite end toward the socket;

a plurality of retainers releasably mounted in the bore in a circular array;

a plurality of blades, each being of a harder material than the material of the retainers, each of the blades having an inner edge; and mounting means for releasably mounting the blades to the retainers with the inner edges positioned to define a conical space that converges toward the socket for gripping the member.

5. The apparatus according to claim 4 wherein the retainers are secured in the housing by a plurality of screws extending radially inward through passages in the housing into threaded holes in the retainers.

6. A chuck for use in screwing one threaded member into another threaded member, comprising in combination:

a housing having a polygonal socket on one end for receiving a polygonal drive head of a wrench to rotate the housing with the wrench, the housing having a face on an opposite end;

the housing having a conical bore converging from the face toward the socket, the bore having a longitudinal axis;

a plurality of retainers releasably mounted in the bore in a circular array, each retainer having an outer wall that mates with the bore, each retainer extending substantially the length of the bore;

each retainer having edges on opposite sides that are spaced apart from the edges of the adjacent retainers to define a receptacle between each of the retainers, the circumferential width of each retainer from edge to edge decreasing from the face toward the socket proportional to the taper of the bore so as to provide a constant dimension to each receptacle from one end of the retainers to the other end;

each of the edges of each retainer being inclined relative to radial lines emanating from the axis of the bore;

a plurality of blades, each releasably inserted into one of the receptacles, each blade having sides that mate with the edges of the retainer, each blade having a gripping edge that protrudes inward from the receptacle a substantially constant distance from one end of each receptacle to the other end, defining with the gripping edges of the other blades a conical space that converges toward the socket for gripping the member; and securing means for securing the blades in the receptacles.

7. The chuck according to claim 6 wherein each blade has a leading surface and a trailing surface on each gripping edge relative to the direction of tightening rotation of the housing, the leading surface intersecting and leading a radial line of the bore which passes through the gripping edge.

8. The chuck according to claim 6 wherein each blade is substantially square in transverse cross-section, and wherein each blade is positioned in one of the receptacles with an outer edge diagonally from the gripping edge and touching the bore of the housing, the receptacle being oriented such that a radial line passing through the gripping edge rotationally leads a radial line passing through the outer edge.

9. The chuck according to claim 6 wherein one of the edges of each retainer has a longitudinal recess formed therein to prevent inward movement of the blade.

10. The apparatus according to claim 6 wherein the retainers are secured in the housing by a plurality of screws extending radially inward through passages in the housing into threaded holes in the retainers.

11. The chuck according to claim 6 wherein the blades are of a harder material than the retainers.

12. A chuck for use in rotating a member, comprising in combination:

a housing having a polygonal socket on one end for receiving a polygonal drive head of a wrench to rotate the housing with the wrench;

the housing having a bore extending from an opposite end toward the socket;

a plurality of retainers mounted in the bore in a circular array, each retainer having edges on opposite sides that are spaced apart from the edges of the adjacent retainers to define a receptacle between each of the retainers;

a plurality of blades, each releasably inserted into one of the receptacles, each blade having an inner edge that defines with the edges of the other blades a conical space that converges toward the socket for gripping the member; and securing means for securing the blades in the receptacles.

13. An apparatus for rotating a member, comprising in combination:

a housing having a polygonal socket on one end;

a power driven wrench having a polygonal drive head for insertion into the socket to rotate the housing with the wrench;

the housing having a bore extending from an opposite end toward the socket;

a plurality of retainers mounted in the bore in a circular array;

a plurality of blades, each being of a harder material than the material of the retainers, each of the blades having an inner edge; and mounting means for releasably mounting the blades to the retainers with the inner edges positioned to define a conical space that converges toward the socket for gripping the member.

14. A chuck for use in screwing one threaded member into another threaded member, comprising in combination:

a housing having a polygonal socket on one end for receiving a polygonal drive head of a wrench to rotate the housing with the wrench, the housing having a face on an opposite end;

the housing having a conical bore converging from the face toward the socket, the bore having a longitudinal axis;

a plurality of retainers mounted in the bore in a circular array, each retainer having an outer wall that mates with the bore, each retainer extending substantially the length of the bore;

each retainer having edges on opposite sides that are spaced apart from the edges of the adjacent retainers to define a receptacle between each of the retainers, the circumferential with of each retainer from edge to edge decreasing from the face toward the socket proportional to the taper of the bore so as to provide a constant dimension to each receptacle from the one end of the retainers to the other end;

each of the edges of each retainer being inclined relative to radial lines emanating from the axis of the bore;

a plurality of blades, each releasably inserted into one of the receptacles, each blade having sides that mate with the edges of the retainer, each blade having a gripping edge that protrudes inward from the receptacle a substantially constant distance from the one end of each receptacle to the other end, defining with the gripping edges of the other blades a conical space that converges toward the socket for gripping the member; and securing means for securing the blades in the receptacles.

* * * * *